United States Patent [19]

Kawanabe

[11] Patent Number: 4,960,971
[45] Date of Patent: Oct. 2, 1990

[54] WIRE EDM WITH APPARATUS SUPPORTING A WORKPIECE THROUGH WALL OF MACHINING BATH

[75] Inventor: Tasuku Kawanabe, Nagoya, Japan

[73] Assignee: Brother Kogyo Kabushiki Kaisha, Nagoya, Japan

[21] Appl. No.: 397,842

[22] Filed: Aug. 24, 1989

[30] Foreign Application Priority Data

Aug. 31, 1988 [JP] Japan ............... 63-114258[U]

[51] Int. Cl.⁵ .............................................. B23H 7/02
[52] U.S. Cl. ................................................ 219/69.12
[58] Field of Search ............... 219/69.12, 69.14, 69.11; 279/1 L, 1 R, 1 ME, 114; 204/297 R; 269/56, 57, 77, 78, 85, 86, 297 R

[56] References Cited

U.S. PATENT DOCUMENTS

| | | | |
|---|---|---|---|
| 2,557,301 | 6/1951 | Lundy | 279/1 ME |
| 2,698,185 | 12/1954 | Sloan | 279/1 L |
| 2,825,572 | 3/1958 | Sloan et al. | 279/1 L |
| 3,682,491 | 8/1972 | Sakazaki et al. | 279/1 |
| 4,547,646 | 10/1985 | Briffod | 219/69.17 |
| 4,628,172 | 12/1986 | Inoue | 219/69.14 |
| 4,647,747 | 3/1987 | Goto | 219/69.12 |
| 4,685,687 | 8/1987 | Hall et al. | 279/1 ME |

FOREIGN PATENT DOCUMENTS

| | | | |
|---|---|---|---|
| 2632528 | 1/1978 | Fed. Rep. of Germany | 279/114 |
| 55-48529 | 4/1980 | Japan | 219/69.12 |
| 56-45324 | 4/1981 | Japan . | |
| 57-163024 | 10/1982 | Japan | 219/69.12 |
| 58-10423 | 1/1983 | Japan . | |
| 60-197320 | 10/1985 | Japan . | |
| 62-27935 | 6/1987 | Japan . | |
| 679110 | 9/1952 | United Kingdom | 279/114 |

Primary Examiner—A. D. Pellinen
Assistant Examiner—Geoffrey S. Evans
Attorney, Agent, or Firm—Oliff & Berridge

[57] ABSTRACT

In a wire EDM a workpiece holder has a fluid tight chuck unit connected to a rotation shaft for rotational movement while supporting the workpiece during a machining operation. A cover member and a seal between the cover member and a wall of the machining bath or tank are used to prevent leakage of the machining liquid. A drive system rotates the shaft under the control of a CPU with a rotation speed detector and a rotation angle detector providing feedback information. Optionally the rotational shaft can extend obliquely into the bath.

12 Claims, 7 Drawing Sheets

WIRE EDM WITH APPARATUS SUPPORTING A WORKPIECE THROUGH WALL OF MACHINING BATH

BACKGROUND OF THE INVENTION

The present invention relates to a wire-electrical discharge machining apparatus, and more particularly to a type thereof capable of performing an intricate three dimensional machining.

Figure 3A:
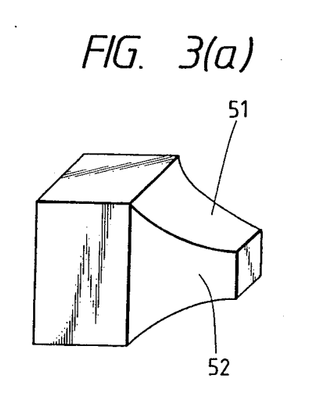
FIGS. 3(a) and 3(b) are perspective views showing examples of appearances of machined products.
Figure 3B:
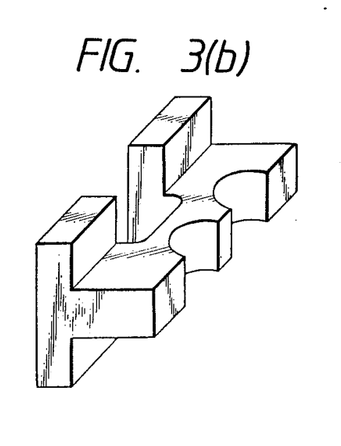

In a wire-electrical discharge machining, a workpiece is subjected to cutting by a suspended wire electrode. This is fundamentally two dimensional machining. Therefore, for a production of a final product having a complicated three dimensional shape as shown in FIGS. 3(a) and 3(b), a workpiece undergoes rotational indexing so as to angularly provide various machining faces to be machined.

According to a conventional electrical discharge machining apparatus in which a workpiece is movable in X and Y axes, an operator removes the workpiece upon completion of machining to a one machining face, and another machining face is provided for subsequent machining after positional adjustment relative to the wire electrode. Therefore, it would be almost impossible to perform unmanned or unattended machining. Further, due to regripping of the workpiece in order to change machining faces, minute positional error may be provided, and accordingly, it would be impossible to perform multi-polygonal machining with high dimensional accuracy. In order to overcome the above described deficiencies, another type of electrical discharge machining apparatus has been proposed as disclosed in Japanese Patent Application Kokai Nos. 56-45324, 58-10423 and Japanese Patent Publication No. 62-27935. This apparatus provides a rotation shaft, so called a B-axis shaft, which allows a workpiece to be rotated about its axis so as to eliminate removal and gripping of the workpiece relative to a chuck. Further, no particular attention is drawn to a supply of a machining liquid. Therefore, in this type of apparatus, flushing is applied in which the machining liquid flows at high velocity from a nozzle to remove lodged deposits at machining gaps.

Figure 4A:
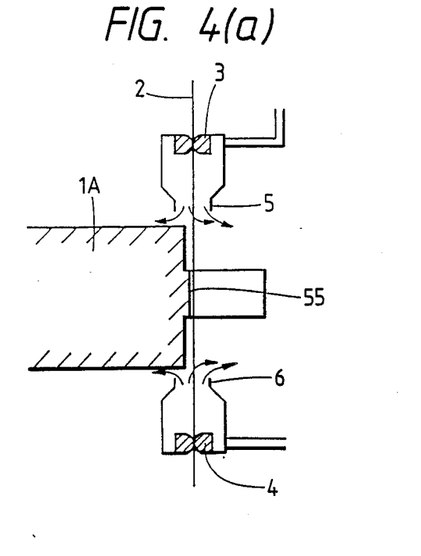
FIGS. 4(a) and (4b) are schematic cross-sectional views showing examples of machining modes relative to the shapes of workpieces.
Figure 4B:
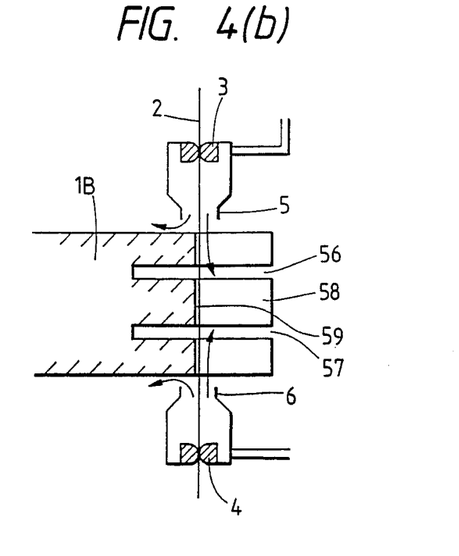

However, if the intricate machining is required in order to obtain an intricate final shape, machining liquid does not sufficiently reach the machining gap only by the flushing. Flushing is available for two dimensional machining to a plate like workpiece, since the nozzle is easily accessible to upper and lower faces of the plate so as to sufficiently introduce the machining liquid into the machining gap. In case of the machining to polygonal faces with rotating the workpiece or with rotary indexing, however, various machining modes are conceivable such as machining to a stepped portion or to a hollow configuration as shown in FIGS. 4(a) and 4(b). In such cases, nozzles 5 and 6 cannot be positioned close to an internal machining gap 55 or 59. Accordingly, machining liquid may be scattered and the liquid is not sufficiently introduced into the machining gaps 55 and 59 only by the flushing. As a result, a wire electrode 2 may be cut.

SUMMARY OF THE INVENTION

It is therefore, an object of the present invention to overcome the above described drawbacks and disadvantages and to provide an improved wire-electrical discharge machining apparatus.

Another object of the invention is to provide such apparatus in which machining to a workpiece providing various angular orientation is facilitated in unmanned or unattended mode.

Still another object of the invention is to provide such improved apparatus capable of preventing a wire electrode from cutting.

Still another object of the invention is to provide such apparatus which can introduce sufficient machining liquid to a machining gap which is caused during production of a product having intricate three dimensional shape.

These and other objects of the invention will be attained by providing a wire electrical discharge machining apparatus comprising; a wire electrode extending along one axis for applying an electrical discharge to a workpiece, moving means for moving the workpiece with respect to the wire electrode, a machining gap being defined between the wire electrode and the workpiece, nozzle means for injecting a machining liquid to the machining gap, a machining bath accumulating the machining liquid therein for dipping the workpiece in the machining liquid, a rotation shaft having a chuck unit for supporting the workpiece for rotatably positioning the workpiece in the machining liquid, a drive means for rotating the rotation shaft, and control means for controlling rotation of the rotation shaft.

In another aspect of the invention, there is provided a wire electrical discharge machining apparatus comprising; a wire electrode extending along one axis for applying an electrical discharge to a workpiece, moving means for moving the workpiece with respect to the wire electrode, a machining gap being defined between the wire electrode and the workpiece, a machining bath accumulating the machining liquid therein for dipping the workpiece in the machining liquid, a rotation shaft having a chuck unit for supporting the workpiece for rotatably positioning the workpiece in the machining liquid, said chuck being sealed against the machining liquid, a drive means for rotating the rotation shaft; and control means for controlling rotation of the rotation shaft.

In still another aspect of the invention, there is provided a wire electrical discharge machining apparatus comprising: a wire electrode extending along one axis for applying an electrical discharge to a workpiece, moving means for moving the workpiece with respect to the wire electrode, a machining gap being defined between the wire electrode and the workpiece, a machining bath accumulating the machining liquid wherein for dipping the workpiece in the machining liquid, a rotation shaft rotatably supported in the machining bath, a chuck unit connected to the rotation shaft for supporting the workpiece, the chuck unit having a gripping means and moving means for moving the gripping means toward and away from the workpiece, sealing means for sealing at least the moving means against the machining liquid, a drive means for rotating the rotation shaft; and control means for controlling rotation of the rotation shaft.

In still another aspect of the invention, there is provided a fluid tight chuck unit coupled to a rotation shaft for holding a workpiece and used in a liquid, the chuck unit comprising; a holder coupled to the rotation shaft, the holder having a wall portion, a cover member fitted with the holder, the cover member and the holder providing an annular space therebetween, a plurality of gripping members supported by the holder and movable in a radial direction thereof, the gripping members extending through the wall portion of the holder, a driving ring body disposed in the annular space and rotatably supported on the holder, a driving body supported to one of the cover member and the holder and connected to the driving ring body for rotating the driving ring body about its axis, convertor means provided between the driving ring body and the gripping members for converting the rotary motion of the driving ring body into radially sliding motions of the gripping members, a first sealing means provided between the holder and the cover member, a second sealing means provided between the driving body and one of the cover member and the holder, and a third sealing means provided between the gripping members and the holder, whereby the annular space is sealingly maintained.

DETAILED DESCRIPTION OF THE PREFERRED EMBODIMENTS

Figure 1:
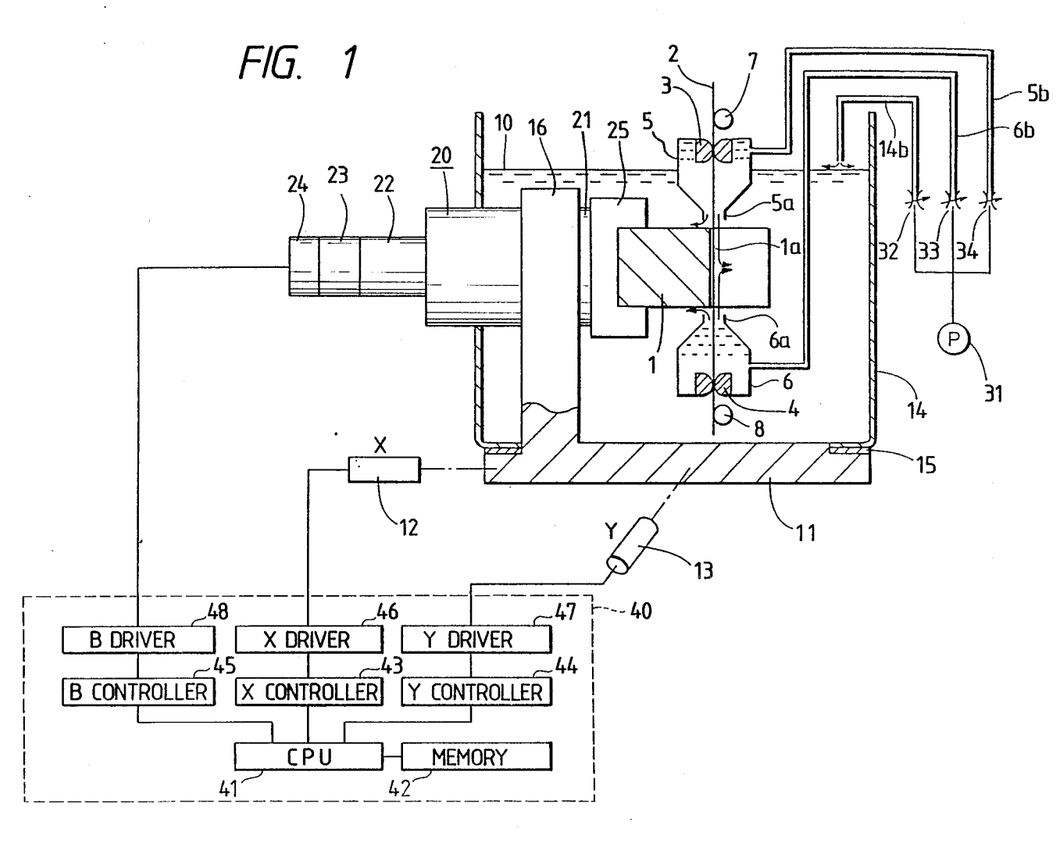
FIG. 1 is a schematic cross-sectional view showing a wire-electrical discharge machining apparatus according to one embodiment of this invention.

A wire electrical discharge machining apparatus according to one embodiment of this invention will be described with reference to FIGS. 1 thru 5(b). As best shown in FIG. 1, a table 11 is provided movable in a horizontal plane. The table 11 is connected to a X-axis motor 12 and Y-axis motor 13 for the movement in X and Y directions, which movements are guided by guide means (not shown). The table 11 integrally provides an upstanding post 16.

A machining bath 14 is fixedly mounted on the table 11, and a gasket 15 is interposedly provided between the bath 14 and the table 11 for sealingly maintaining the bath 14, to thereby accumulate a machining liquid 10 such as water therein. The post 16 is positioned within the bath 14.

A rotation drive means (B-axis rotation drive means) 20 is secured to the post 16, and a rotation shaft (B-shaft) 21 is rotatably journalled by the rotation drive means 20. The rotation shaft 21 extends in horizontal direction within the bath 14. Further, a drive motor (B-axis motor) 22 is mounted on the rotation drive means 20 to rotate the shaft 21 about its axis, and rotation speed detector 23 and a rotation angle detector 24 are coupled to the drive motor 22. The rotation shaft 21 has one end provided with a chuck unit 25 (described later in detail) for holding a workpiece 1.

A wire electrode 2 suspendedly extends in vertical direction under tension by a drive roller and a tension roller (not shown). The wire electrode 2 confronts a machining gap 1a defined at the workpiece 1 held by the chuck 25. Upper and lower wire guides 3 and 4 are provided for guiding vertical travel of the wire electrode 2. These wire guides are in the form of dies so as to fix a position of the wire electrode 2 relative to the workpiece 1. The upper and lower wire guides 3 and 4 are respectively housed in casings 5 and 6 which are connected to a pump 31 through conduits 5b and 6b. The bath 14 is in fluid communication with the pump 31 through a conduit 14b. Further, flow rate control valves 32, 33, 34 are provided at the conduits 5b, 6b and 14b for controlling flow rate of the machining liquid to the casings 5,6 and the bath 14.

The casings and 6 have internal ends provided with nozzles 5a and 6a in immediate confrontation with the workpiece 1 so as to inject machining liquid therethrough in an axial direction of the wire electrode 2, whereby intensive liquid stream is generated which can pass through the machining gap 1a.

Feeders 7 and 8 are positioned in slide contact with the wire electrode 2 so as to supply a pulse form electrical voltage thereto from a power source (not shown). This pulse form electrical voltage will generate electrical discharge between the wire electrode 2 and the workpiece for performing electrical discharge machining.

The X-axis, y-axis motors 12 and 13 for moving the table 11 in the horizontal plane and the B-axis motor 22 for rotating the workpiece 1 are connected to a numerical control (NC) unit 40 for controlled rotations of these motors. Further, rotation speed detector 23 and the rotation angle detector 24 are also connected to the NC unit 40 for controlling the rotation speed and angular position of the rotation shaft (B-shaft) 21.

The NC unit 40 includes a CPU 41, a memory 42, controllers 43, 44, 45 for controlling X position, Y position of the table 11 and for controlling the rotation of the workpiece 1, and drivers 46, 47 48 for controlling X-axis motor 12, Y-axis motor 13 and the B-axis motor 22. The above described X-axis Y-axis motors 12, 13 for moving the table 11 in the horizontal plane, and the controllers 43, 44 and drivers 46 47 in the NC unit 40 for controlling these motors 12 and 13 function as a moving means for moving the workpiece in the horizontal plane relative to the wire electrode 2. Further, the above described detectors 23 and 24 for controlling the B-axis motor 22, the controller 45 and the driver 48 for the B-axis control function as a rotation control means for controlling rotation of the workpiece.

Figure 6:
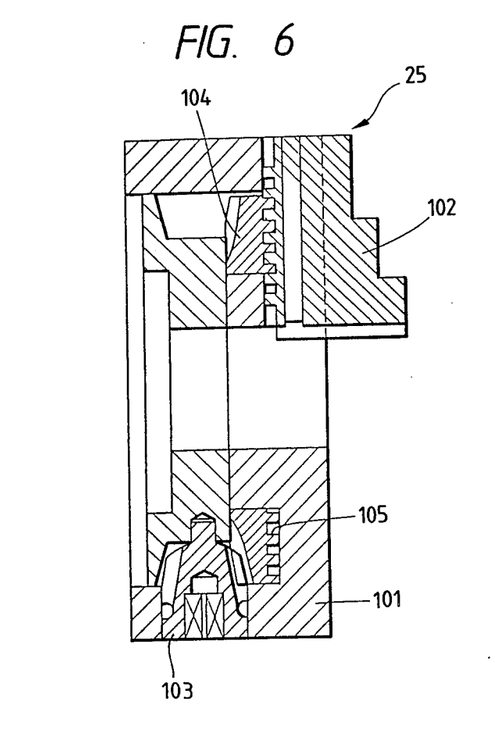
FIG. 6 is a cross-sectional view showing a chuck unit for holding a workpiece used in one embodiment of this invention.

The chuck unit 25 for holding the workpiece 1 will be described with reference to FIG. 6. The chuck unit 25 is of a scroll type which is also available in a field of turning. The chuck unit 25 is dipped in the machining liquid 10 as shown in FIG. 1. Therefore, the chuck unit 25 is formed of a stainless steel so as to provide a high mechanical strength and corrosion resistance. The chuck unit 25 includes a disc like holder 101 and three gripping members 102 disposed slidable relative to the holder 101 in radial direction thereof. A bevel gear 103 is provided with which an annular driving member 104 is meshedly engaged. The annular driving member 104 is movably accommodated within the disc like holder 101, and is formed with a Archimedes's spiral groove 105. The three gripping members 102 are engaged with the spiral groove 105. Therefore, upon rotation of the bevel gear 103, the annular driving member 104 is rotated about its axis, so that the three gripping members 102 are moved in radial direction of the workpiece by way of the guide of the spiral of Archimedes.

Operation mode according to the first embodiment will next be described.

Figure 2A:
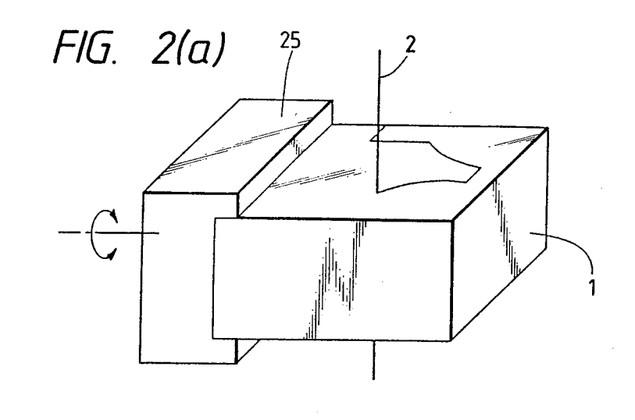
FIGS. 2(a) and 2(b) are perspective views showing one example of machining process.
Figure 2B:
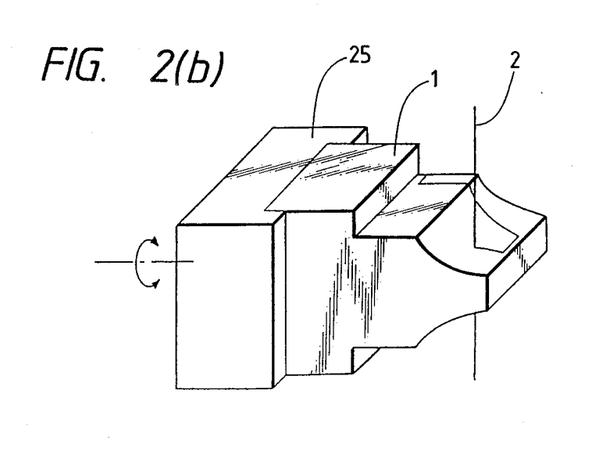

The workpiece 1 is held by the chuck 25 of the B-axis rotation shaft 21, and is subjected to machining while dipped in the machining liquid 10 in the bath 14. In a general machining mode, the angular position of the rotation shaft 21 is stationarily maintained, and the table 11 is moved in the horizontal plane by the X, Y-axis motors 12 13 for electrical discharge machining to one angular position of the workpiece. Upon completion of machining, the B-axis motor 22 is energized for rotating the workpiece to provide another angular position thereof for the subsequent machining. Such rotational indexing is successively carried out for machining the workpiece at its various angular positions. For example, in order to obtain a final configuration shown in FIG. 3(a) of the workpiece 1 which provides a first arcuate face 51 and a second arcuate face 52, a block like workpiece is prepared, and the block is cut along the first arcuate face 51 as shown in FIG. 2(a) while maintaining a first angular position of the block 1. Then, the block like workpiece 1 is rotated by 90 degrees, and the block is cut along the second arcuate face 52 by the electrical discharge machining.

Therefore, in the first embodiment of this invention, the polygonal face machining is achievable without removal of the workpiece from the chuck unit 25. Accordingly, highly accurate three dimensional machining can be made without any dimensional error which is due to disassembly and re-assembly of the workpiece with respect to the chuck unit 25.

Moreover, in the embodiment, since the workpiece 1 is always dipped in the machining liquid 10, the machining liquid can be entered into an intricate machining gaps, to thereby avoid disadvantageous cutting of the wire electrode 2. For example, as shown in FIG. 4(a), in case of a workpiece 1A having stepped portion, if the machining to the stepped wall portion is required, the upper and lower nozzles 5 and 6 cannot be accessed to the machining gap 55, since the shoulder portion of the workpiece 1A prevents the nozzles 5 and 6 from being positioned close to the machining gap 55. However, in the embodiment, the machining liquid accumulated in the bath 14 can reach the machining gap 55.

Further, in case of the machining to a workpiece 1B shown in FIG. 4(b) which provides a central core portion 58 surrounded by a hollow spaces 56, 57, the machining liquid ejected from the nozzles 5 and 6 may be dispersed at the hollow portions 56, 57, so that the liquid cannot reach the machining gap 59 at the central core portion 58. However, the machining liquid in the bath 14 can reach the gap 59. As a result, wire electrode cutting is avoidable. Furthermore, because of the dip-machining, the workpiece 1 can provide a uniform temperature, to thereby avoid machining error due to thermal deformation of the workpiece, and rust generation on the workpiece can be reduced because of non-exposure to atmosphere.

Moreover, in the embodiment, rotational indexing of the workpiece is automatically made by the NC unit 40. Therefore, unmanned or unattended machining is achievable by further providing a device for forming a through hole in the workpiece for allowing the wire electrode to pass therethrough so as to initiate the wire electrical discharge machining as well as providing a device for automatically inserting the wire electrode into the through hole.

Figure 5A:
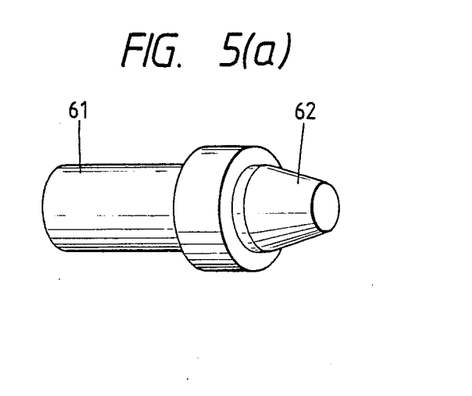
FIGS. 5(a) and 5(b) are perspective views showing another examples of external appearances of machined products.
Figure 5B:
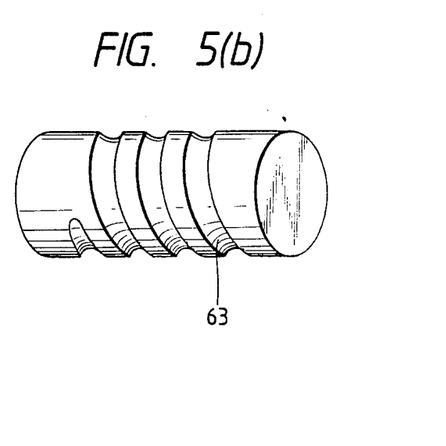

In the embodiment described above, the rotation shaft 21, only serves as the rotational indexing, and it is fixedly maintained during machining. However, the rotation shaft 21 can be rotated during machining in timed operation of X and Y-axis motors so as to provide a product having a cylindrical portion 61 and a tapered portion 62 as shown in FIG. 5(a). Furthermore, it is also possible to form a spiral portion 63 on the workpiece with imparting U, V-axes function on the wire electrode 2 by displacing the wire guide 3 for inclining the wire electrode 2 with respect to the vertical line. Incidentally, U, V axes defines a plane in parallel with a plane defined by X, Y axes.

Second to fourth embodiments according to the present invention will be described. The following embodiments concern improvement on the chuck unit 25 in the first embodiment. More specifically, the chuck unit 25 in the first embodiment is directly exposed to the machining liquid 10, and therefore, there is a likelihood that cutting chips as well as the machining liquid is entered into the chuck. If the cutting chips are accumulated on the gripper members 102 or on the spiral groove 105 or on the meshed gear portions, workpiece holdability or gripping accuracy may be degraded. Further, in the chuck 25 of the first embodiment, the chuck is formed of stainless steel, which is rather costly and difficult to manufacture. Accordingly, resultant chuck unit 25 becomes costly. Therefore, in the following embodiments, improvements are made to provide sealing type chucks which are fluid-tightly maintained within a machining liquid bath 14, and which can be provided at low cost.

Figure 7:
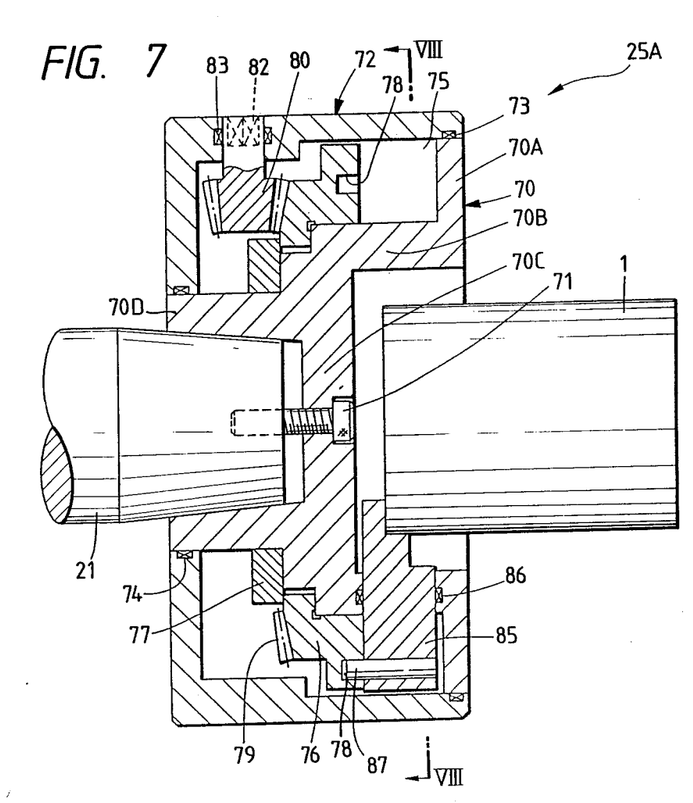
FIG. 7 is a cross-sectional view showing a chuck unit for holding a workpiece according to a second embodiment of this invention.
Figure 8:
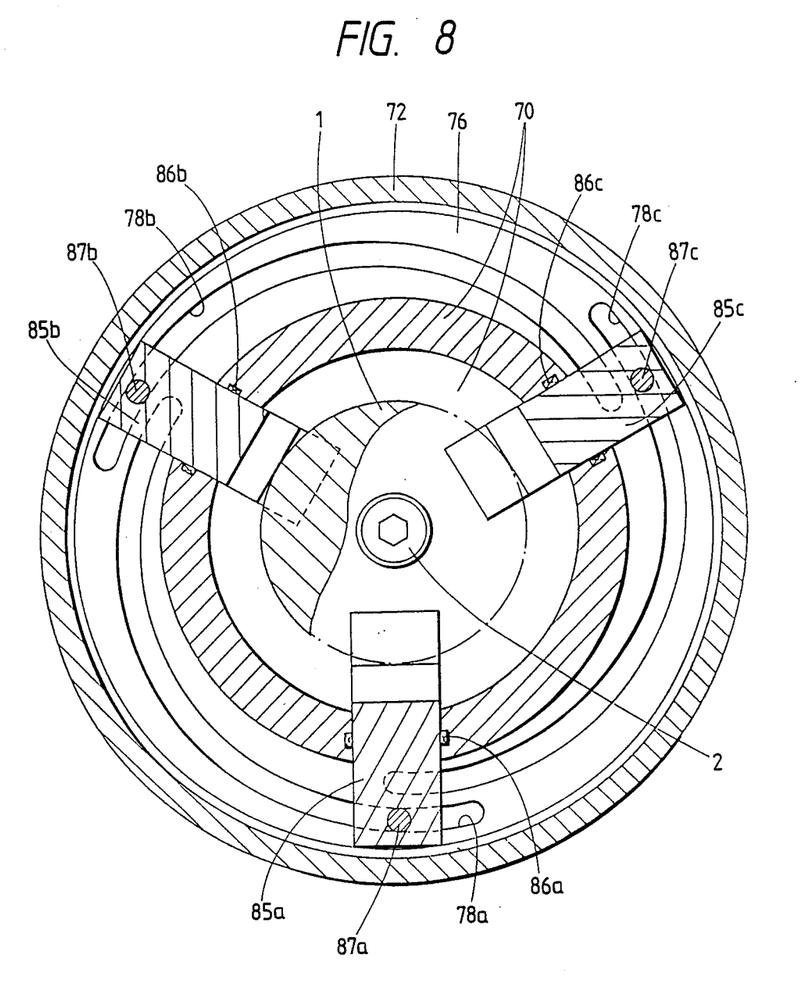
FIG. 8 is a cross-sectional view taken along a line VIII—VIII of FIG. 7.

FIGS. 7 and 8 show a sealing type chuck unit 25A according to a second embodiment of this invention. A rotary shaft 21 driven by the B-axis drive motor 22 (FIG. 1) has a tapered end portion to which a holder 70 is coupled. The holder 70 has a circular outer profile, and has a tapered sleeve portion 70D, a bottom wall 70C, a sleeve portion 70B and a flange portion 70A. The tapered sleeve portion 70D is fitted with the tapered end of the rotary shaft 21, and the holder 70 is fixedly secured to the shaft 21 by means of a bolt 71 extending through the bottom wall 70C.

A generally cup shaped cover member 72 is disposed over the holder 70, and is secured thereto by a bolt (not shown). The cover member 72 is in intimate contact with an outer peripheral end surface of the flange portion 70A and an outer peripheral surface of the tapered sleeve portion 70D, and gaskets or packings 73 and 74 are provided at the corresponding contacting portions. Therefore, annular sealing space 75 is provided by the holder 70 and the cover member 72, which sealing space 75 is fluid-tightly maintained against ambient condition. The holder 70 and the cover member 72 are formed of stainless steel. A peripheral wall of the cover member 72 is formed with a bore through which a shaft of a pinion 80 extends. An annular seal ring 83 is provided between the pinion shaft and the bore for providing sealability of the internal annular space 75. The pinion shaft has an external end formed with a recess 82 with which an external driving means (not shown) is engaged for rotating the pinion 80.

Within the annular space 75, there are provided a driving ring body 76 rotatably supported over the circumferential portion 70B of the holder 70. Further, a support plate 77 is provided over the tapered sleeve portion 70D so as to prevent the driving ring body 76 from its axial displacement. The driving ring body 76 has one side formed with three Archimedes's spiral cam grooves 78 (78a, 78b, 78c as best shown in FIG. 8), and has another side provided with a bevel gear 79. The bevel gear 79 is engageable with the pinion 80.

Three gripping members 85 (85a, 85b, 85c in FIG. 8) are provided radially. These gripping members 85 movably extend through the sleeve portion 70B of the holder 70. Further, annular sealing members 86 and axial seal members 86a, 86b, 86c are provided between the sleeve portion 70B and the gripping members 85 in order to provide fluid-tight structure within the internal annular space 75. Furthermore, driven pins 87 (87a, 87b, 87c in FIG. 8) are implanted on radially outer end portions of the gripping members 85, and are engaged with the spiral cam grooves 78. Each of the gripping members 85 is slidable with respect to the holder 70 and the end face of the driving ring body 76. The gripper members 85 have generally rectangular cross section and are positioned spaced away from each other equidistantly in a circle. Further, inner corners of the gripper members 85 are chamfered for facilitating gripping of the workpiece.

With the structure, the spiral cam grooves 78 formed in the driving ring body 76 and the driven pins 87 implanted on the gripping members 85 function as a converter for converting a rotational motion of the driving ring body 76 into the radially sliding motion of the gripping members 85. Further, the pinion 80 sealingly and rotatably supported on the cover member 72 serves as a drive means for imparting the rotary motion on the driving ring body 76.

In operation, a jig is inserted into the recessed portion 82 of the shaft of the pinion 80 for rotating the latter. Therefore, the driving ring body 76 is also rotated about the sleeve portion 70B of the holder 70. By the rotation of the ring body 76, the spiral cam grooves 78 are angularly displaced, so that the three gripping members 85 are radially and linearly moved at a speed equal to one another in order to grip the workpiece 1. Only the gripping portions of the three grippers 85 are positioned out of the holder 70, and remaining components are sealingly maintained within the annular space 75 defined by the holder 70 and the cover member 72. Further, the internal space is sealingly maintained by packings 73, 74 and the sealing members 83, 86, 86a, 86b and 86c. Therefore, even if the chuck unit 25A is operated under the dipping condition in the machining liquid, no machining liquid is intered into the interior of the holder 70, and no deposition of the cutting chips onto the cam grooves, gear teeth etc. occur. Furthermore, since the machining liquid does not enter the annular space 75, the driving ring body 76 and the pinion 80 can be formed of an ordinary steel which is feasible for machining.

Figure 9:
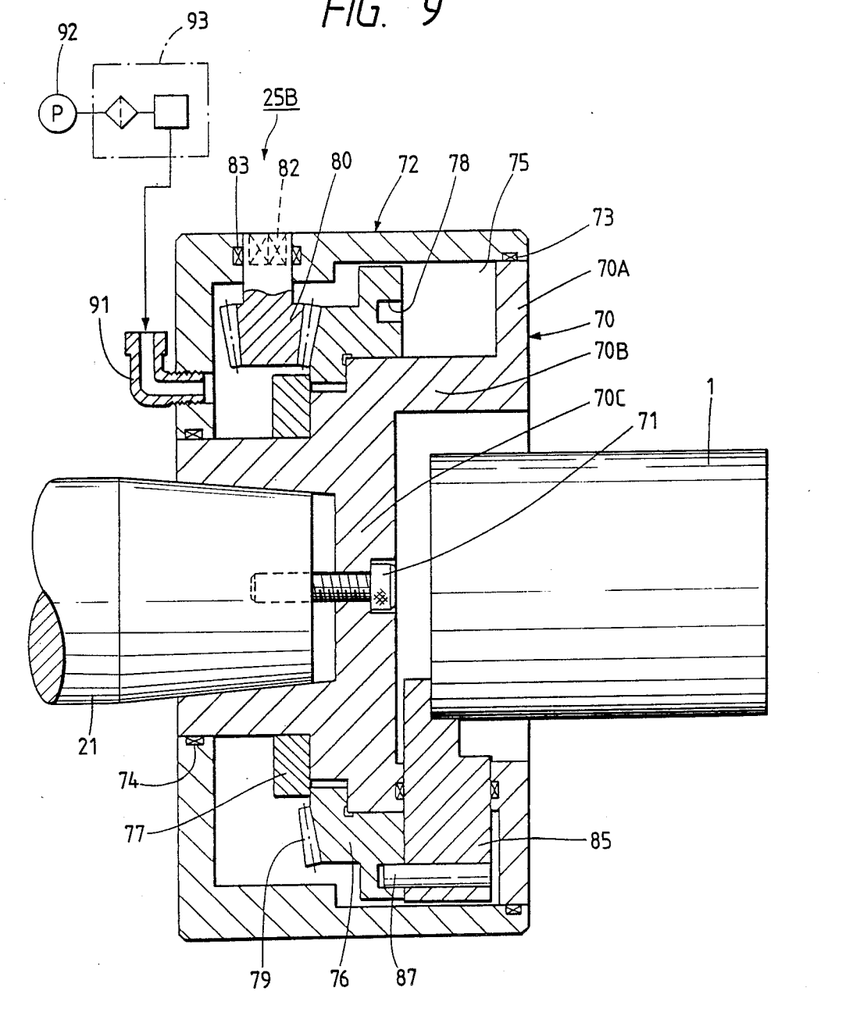
FIG. 9 is a cross-sectional view showing a chuck unit according to a third embodiment of this invention.
Figure 10:
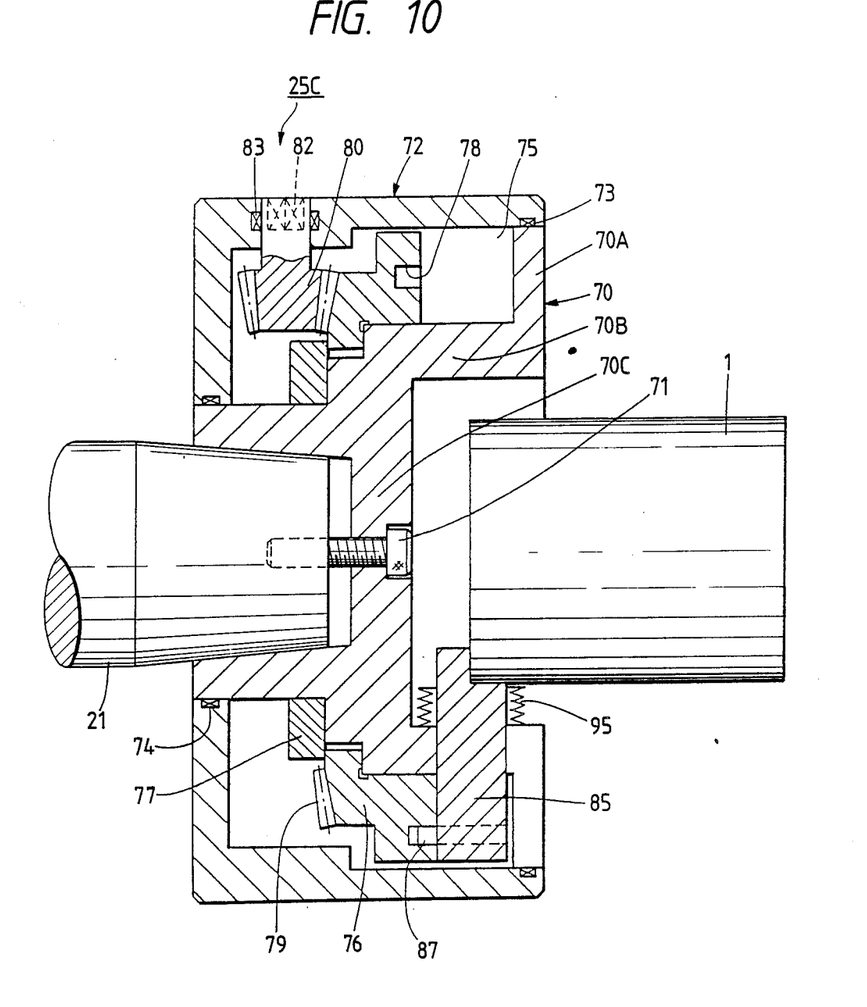
FIG. 10 is a cross-sectional view showing a chuck unit according to a fourth embodiment of this invention.

FIG. 9 shows modification to the chuck unit. This chuck unit 25B has an air inlet member 91 provided at the cover member 72 so as to introduce highly pressurized air into the annular space 75, to thereby further avoid entry of the machining liquid thereinto. For example, the air inlet member 91 is connected to a pneumatic source 92 through a air cleaner unit including a filter, a regulator and a lubricator. Further, FIG. 10 shows another modification of the chuck unit. This chuck unit 25C is provided with bellows 95 disposed between each of the grippers 85 and the holder 70 so as to further avoid entry of the machining liquid through the sliding portion between the grippers and the holder 70.

As described above, according to the present invention, the rotation shaft or B-axis shaft is operated in the machining liquid so as to perform machining to the workpiece within the machining liquid. Therefore, no cutting of the wire electrode occur, and machining can be made at high machining accuracy in order to produce an intricate three dimensional product. Further, unmanned or unattended operation is achievable for producing the intricate product.

Furthermore, in a modification to the chuck unit for holding the workpiece, the unit is fluid tightly arranged, so that the machining liquid cannot be entered into the holder, to thereby protect mechanical driving components from cutting chips or from their depositions. As a result, highly accurate machining is attainable for a long period. Moreover, the mechanical components can be easily and economically provided, since these components can be formed of an ordinary steel because of out of contact with the machining liquid.

While the invention has been described in detail and with reference to specific embodiments thereof, it would be apparent for those skilled in the art that various changes and modifications can be made therein without departing from the spirit and scope of the invention.

What is claimed is:

1. A wire electrical discharge machining apparatus comprising:
   a wire electrode extending along one axis for applying an electrical discharge to a workpiece;
   moving means for moving the workpiece with respect to the wire electrode, a machining gap being defined between the wire electrode and the workpiece;
   nozzle means for injecting a machining liquid to the machining gap;
   a machining bath accumulating the machining liquid therein for dipping the workpiece in the machining liquid;
   a rotation shaft having a chuck unit for supporting the workpiece for rotatably positioning the workpiece in the machining liquid, said rotation shaft affixed to said machining bath such that said rotation shaft and said machining bath are moved together by said moving means for moving the workpiece relative to said wire electrode;
   a drive means for rotating the rotation shaft; and
   control means for controlling rotation of the rotation shaft.

2. The apparatus as claimed in claim 1, wherein the moving means moves the workpiece in a plane perpendicular to the axis of the wire electrode, and wherein the moving means comprises:
   a table;
   a X-axis motor connected to the table;
   a Y-axis motor connected to the table;
   a first driver for controlling the X-axis motor;

a second driver for controlling the Y-axis motor;
a first controller connected to the first driver;
a second controller connected to the second driver; and
a CPU connected to both the first and the second controllers, the machining liquid bath being mounted on the table.

3. The apparatus as claimed in claim 2, wherein the control means comprises: a rotation speed detector coupled to the drive means; a rotation angle detector coupled to the rotation speed detector; a third driver connected to the rotation angle detector; a third controller connected to the third driver, and the CPU connected to the third controller.

4. The apparatus as claimed in claim 1, wherein the nozzle means is disposed coaxial with the wire electrode.

5. The apparatus as claimed in claim 2, wherein the rotation shaft supporting the workpiece extends in a direction parallel with the plane.

6. The apparatus as claimed in claim 2, wherein the rotation shaft supporting the workpiece extends obliquely relative to the plane.

7. The apparatus as claimed in claim 1, wherein the chuck unit comprises;
a holder coupled to the rotation shaft, the holder having a wall portion;
a cover member fitted with the holder, the cover member and the holder providing an annular space therebetween;
a plurality of gripping members supported by the holder and movable in a radial direction thereof, the gripping members extending through the wall portion of the holder;
a driving ring body disposed in the annular space and rotatably supported on the holder;
a driving body supported to one of the cover member and the holder and connected to the driving ring body for rotating the driving ring body about its axis;
convertor means provided between the driving ring body and the gripping members for converting the rotary motion of the driving ring body into radially sliding motions of the gripping members;
a first sealing means provided between the holder and the cover member;
a second sealing means provided between the driving body and one of the cover member and the holder; and
a third sealing mean provided between the gripping members and the holder, whereby the annular space is sealingly maintained.

8. The apparatus as claimed in claim 7, further comprising an air inlet member secured to the cover member, the air inlet member communicating with a pneumatic source for applying compressed air into the annular space.

9. The apparatus as claimed in claim 7, wherein the third sealing means comprises bellows.

10. A wire electrical discharge machining apparatus comprising:
a wire electrode extending along one axis for applying an electrical discharge to a workpiece;
moving means for moving the workpiece with respect to the wire electrode, a machining gap being defined between the wire electrode and the workpiece;
a machining bath accumulating the machining liquid therein for dipping the workpiece in the machining liquid;
a rotation shaft having a chuck unit for supporting the workpiece for rotatably positioning the workpiece in the machining liquid, said chuck being sealed against the machining liquid, said rotation shaft affixed to said machining bath such that said rotation shaft and said machining bath are moved together by said moving means for moving the workpiece relative to said wire electrode;
a drive means for rotating the rotation shaft; and
control means for controlling rotation of the rotation shaft.

11. A wire electrical discharge machining apparatus comprising:
a wire electrode extending along one axis for applying an electrical discharge to a workpiece;
moving means for moving the workpiece with respect to the wire electrode, a machining gap being defined between the wire electrode and the workpiece;
a machining bath accumulating the machining liquid therein for dipping the workpiece in the machining liquid;
a rotation shaft rotatably supported in the machining bath, said rotation shaft affixed to said machining bath such that said rotation shaft and said machining bath are moved together by said moving means for moving the workpiece relative to said wire electrode;
a chuck unit connected to the rotation shaft for supporting the workpiece, the chuck unit having a gripping means and adjustment means for moving the gripping means toward and away from the workpiece;
sealing means for sealing at least the adjustment means against the machining liquid;
a drive means for rotating the rotation shaft; and
control means for controlling rotation of the rotation shaft.

12. A fluid tight chuck unit coupled to a rotation shaft for holding a workpiece and used in a liquid, the chuck unit comprising:
a holder coupled to the rotation shaft, the holder having a wall portion;
a cover member fitted with the holder, the cover member and the holder providing an annular space therebetween;
a plurality of gripping members supported by the holder and movable in a radial direction thereof, the gripping members extending through the wall portion of the holder;
a driving ring body disposed in the annular space and rotatably supported on the holder;
a driving body supported to one of the cover member and the holder and connected to the driving ring body for rotating the driving ring body about its axis;
convertor means provided between the driving ring body and the gripping members for converting the rotary motion of the driving ring body into radially sliding motions of the gripping members;
a first sealing means provided between the holder and the cover member;
a second sealing means provided between the driving body and one of the cover member and the holder; and
third sealing means provided between the gripping members and the holder, whereby the annular space is sealingly maintained.

* * * * *